US006594516B1

(12) United States Patent
Steckner et al.

(10) Patent No.: US 6,594,516 B1
(45) Date of Patent: Jul. 15, 2003

(54) EXTERNAL PATIENT CONTOURING

(75) Inventors: C. Michael Steckner, Richmond Heights, OH (US); Jarmo O. Ruohonen, Vantaa (FI); Gordon D. DeMeester, Wickliffe, OH (US); Robert K. Carlson, Willoughby, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 293 days.

(21) Appl. No.: 09/620,275

(22) Filed: Jul. 18, 2000

(51) Int. Cl.[7] .................................................. A61B 5/05
(52) U.S. Cl. ..................... 600/411; 600/414; 600/426
(58) Field of Search ................................. 600/414, 411, 600/426; 128/898; 356/2

(56) References Cited

U.S. PATENT DOCUMENTS

| | | | | |
|---|---|---|---|---|
| 3,983,474 A | | 9/1976 | Kuipers ..................... 324/43 R |
| 4,705,401 A | * | 11/1987 | Addleman et al. .......... 348/135 |
| 5,005,578 A | * | 4/1991 | Greer et al. ................. 324/318 |
| 5,307,072 A | | 4/1994 | Jones, Jr. .................... 342/147 |
| 5,307,808 A | * | 5/1994 | Dumoulin et al. .......... 600/423 |
| 5,453,686 A | | 9/1995 | Anderson .............. 324/207.17 |
| 5,483,961 A | * | 1/1996 | Kelly et al. .................. 600/417 |
| 5,531,520 A | * | 7/1996 | Grimson et al. ............ 382/131 |
| 5,640,170 A | | 6/1997 | Anderson .................... 343/895 |
| 5,836,954 A | * | 11/1998 | Heilbrun et al. ............ 600/300 |
| 5,848,967 A | * | 12/1998 | Cosman ...................... 600/426 |
| 5,969,822 A | * | 10/1999 | Fright et al. ................. 356/608 |
| 6,026,315 A | * | 2/2000 | Lenz et al. .................. 600/411 |
| 6,167,296 A | * | 12/2000 | Shahidi ....................... 600/427 |

OTHER PUBLICATIONS

Schad, L., et al. Correction of Spatial Distortion in MR Imaging: A Prerequisite for Accurate Stereotaxy, Journal of Computer Assisted Tomography, 11(3):499–505 (1987).*

* cited by examiner

*Primary Examiner*—Marvin M. Lateef
*Assistant Examiner*—Barry Pass
(74) *Attorney, Agent, or Firm*—Fay, Sharpe, Fagan, Minnich & McKee, LLP

(57) ABSTRACT

An open MRI or other diagnostic imaging system (A) generates a three-dimensional diagnostic image representation, which is stored in an MRI image memory (26). A laser scanner or other surface imaging system (B) generates a volumetric surface image representation that is stored in a surface image memory (34). Typically, the volume and surface images are misaligned and the magnetic resonance image may have predictable distortions. An image correlating system (C) determines offset, scaling, rotational, and non-linear corrections to the magnetic resonance image representation, which are implemented by an image correction processor (48). The corrected magnetic resonance image representation and the surface image representation are combined (50) and stored in a superimposed image memory (52). A video processor (54) generates image representations from selected portions of the superimposed image representation for display on a human-readable monitor (56).

20 Claims, 1 Drawing Sheet

EXTERNAL PATIENT CONTOURING

BACKGROUND OF THE INVENTION

The present invention relates to the diagnostic imaging arts. It finds particular application in conjunction with diagnostic imaging in open MRI scanners for oncology treatment applications and will be described with particular reference thereto. It will be appreciated, however, that the invention is also applicable to other types of diagnostic imaging for oncological purposes and for diagnostic imaging for other purposes.

In oncological planning, the oncologist typically determines a point of entry on the patient's skin and a trajectory through the patient. Typically, the oncologist plans a trajectory and the point of entry in conjunction with projection x-ray images, CT scanner images, or other diagnostic images.

One of the difficulties encountered in oncological procedures is accurately aligning the x-ray beam with the internal tumor. If the selected trajectory is only slightly off, the x-ray beam will treat most of the tumor, but leave a small segment un-irradiated. Un-irradiated tumor tissue can survive the treatment.

Once the point of entry and the trajectory have been determined, the oncologist points an x-ray beam to enter the patient at the selected point of entry and follow the selected trajectory. Ideally, the x-ray beam is selected to have a diameter at least as large as the tumor to be irradiated. Making the diameter of the beam too large is detrimental in that it irradiates and harms healthy tissue.

Typically, the treatment process is repeated through a plurality of different trajectories to maximize the radiation at the tumor while minimizing radiation through surrounding tissue. In many instances, the tumor is over-irradiated to assure that portions of the tumor which might be missed along some trajectories are still fully irradiated. This over-radiation, like using a beam that is too large, has a detrimental effect on surrounding tissue.

Typically, x-ray images are used to generate the diagnostic images. X-ray images are advantageous in that they image the entire patient contour, including the surface boundaries facilitating selection of the point of entry. Unfortunately, it is sometimes difficult to differentiate between tissue types, such as cancerous and non-cancerous tissue with x-rays. Magnetic resonance imaging has much better differentiation of tissue types. However, magnetic resonance images tend to be of smaller, internal regions and often do not include the patient surface. When a larger region is imaged that includes the patient surface, peripheral portions of the image tend to be warped or distorted. Selecting the point of entry based on a warped or distorted image can cause mis-alignment between the beam and the cancerous tumor which, as discussed previously, can create the unwanted destruction of healthy tissue.

The present invention provides a new and improved method and apparatus which overcomes the above-referenced problems and others.

SUMMARY OF THE INVENTION

In accordance with one aspect of the present invention, a diagnostic imaging system is provided. A medical diagnostic imaging apparatus generates volumetric diagnostic image representations of an internal region of a subject in an imaging region. A surface imaging system generates a three-dimensional image representation of the surface of the subject in the imaging region. An image correlating system correlates the surface and diagnostic image representations. A superimposed volumetric image representation memory stores combined correlated surface and diagnostic image representations. A video processor withdraws selected portions of the combined image representation and converts them into appropriate form for human-readable display.

In accordance with another aspect of the present invention, a method of diagnostic imaging is provided. A volumetric diagnostic image representation of an internal region of a subject and at least a portion of a surface of the subject is generated. However, the diagnostic image representation has distortions, particularly in a region adjacent the surface of the subject. A surface imaging system generates a three-dimensional image representation of the surface of the subject. The diagnostic image representation is adjusted to correlate at least the surface region of the diagnostic image representation with the surface image representation. The adjusted diagnostic image representation and the surface image representation are combined.

One advantage of the present invention resides in its improved differentiation of soft tissue.

Another advantage of the present invention is that it facilitates a reduction in radiation doses in oncological treatments.

Another advantage of the present invention is that it facilitates location of internal patient structures from the exterior of the patient based on diagnostic images.

Another advantage of the present invention is that it reduces total patient radiation dose relative to x-ray and CT diagnostic imaging techniques.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

Figure 1:
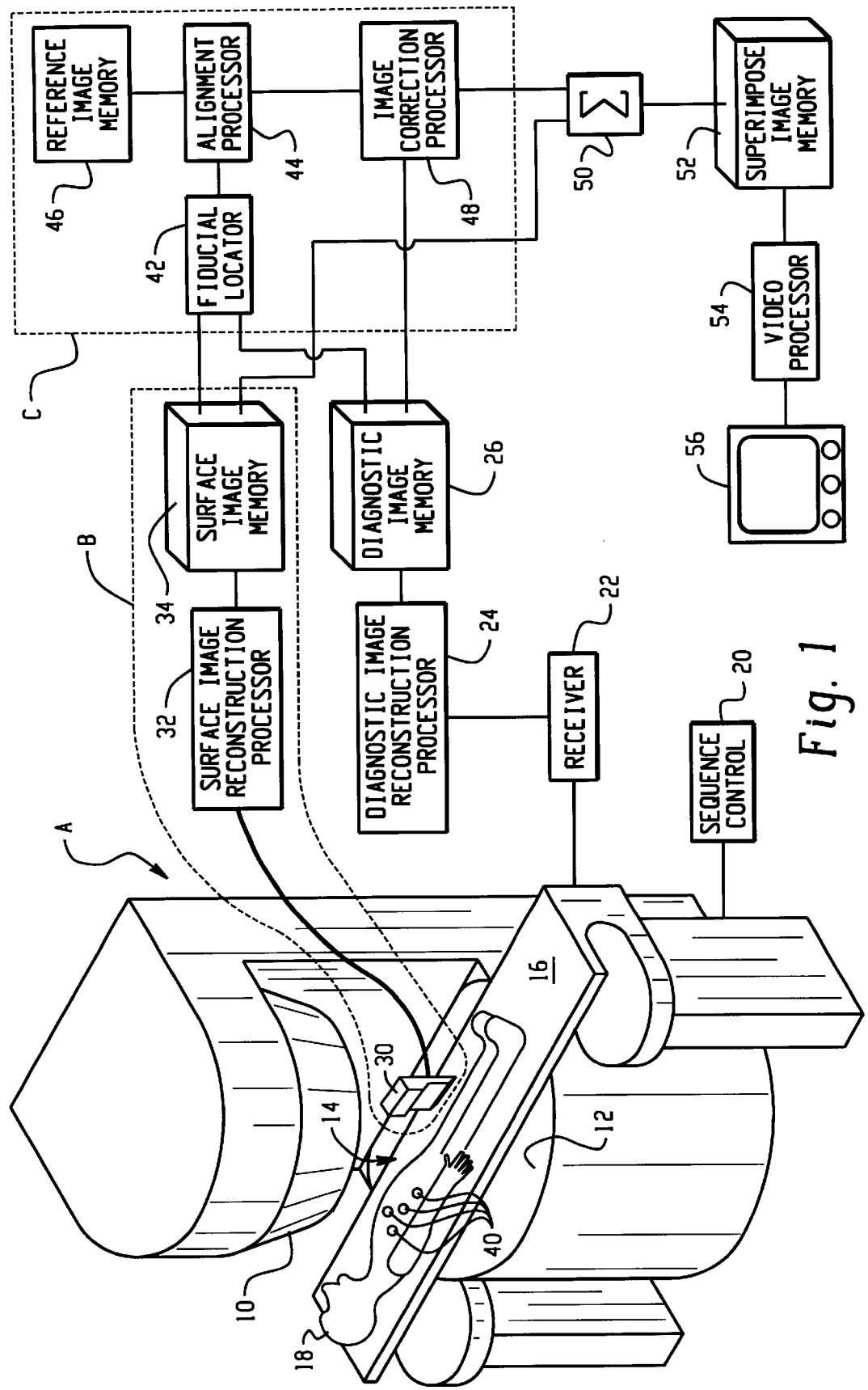
FIG. 1 is a diagrammatic illustration of an image generation system in accordance with the present invention.

With reference to FIG. 1, a medical diagnostic imaging apparatus A, such as an open magnetic resonance imaging system, generates a volumetric image of an internal region of the patient including a portion of the patient surface. A surface imaging system B generates a volumetric image of the patient surface. An imaging correlating system C scales, shifts, rotates, and non-linearly adjusts the medical diagnostic image to bring it into correlation with the surface image representation. The correlated images are combined to provide a combined or superimposed image of interior and surface from which the oncologist extracts medically appropriate slice, 3D rendered, or other images for planning the oncological procedure.

The diagnostic imager A in the preferred embodiment is a vertical field magnetic resonance imaging system that includes an upper pole 10 and a lower pole 12. Magnets, preferably superconducting, generate a vertical magnetic field through an imaging region 14 between the poles 10 and 12. A patient support 16 is movable in three dimensions to position a region of interest of a subject 18 in the imaging region.

A sequence control processor 20 controls gradient and radio frequency coils associated with the poles 10, 12 of the magnetic resonance imager to induce and manipulate magnetic resonance, as is known in the art, to generate magnetic resonance signals. The generated magnetic resonance signals are picked by radio frequency coils, demodulated by a receiver 22, and reconstructed by an MRI image reconstruction processor 24 into an electronic image representation. The electronic image representation of the region of interest of the subject disposed in the imaging region 14 is stored in an MRI volume image memory 26.

The surface imaging system B in the preferred embodiment is a hand-held laser scanning system. More specifically, the laser scanning system includes a hand-held unit 30 which sweeps a laser beam. The hand-held unit 30 is positioned such that the laser beam scans the surface of the subject 18 in the imaging region 14. The reflected laser light received by the hand-held unit 30 generates electronic signals which are conveyed to a surface image reconstruction processor 32 which reconstructs an electronic image representation of the surface of the subject 18 in three dimensions. A surface volume image memory 34 stores the electronic image representation. Other known surface imaging systems are also contemplated, such as ultrasonic imaging systems, optical imaging systems such as those with stereo cameras, mechanical arms which are moved over the surface, and the like.

In order to facilitate coordination of the surface and MRI diagnostic images, a plurality of fiducials 40 that are imageable by both the MRI imaging system and the surface imaging system, are preferably adhered to several, scattered positions on the surface of the patient in the examination region. Alternately, anatomical markers that are identifiable in both images can be utilized analogously. The image correlating system C includes a fiducial locating processor 42 which examines the electronic surface and diagnostic image representations to identify the fiducials 40 in each. More specifically, the fiducial locating processor 42 generates a three-dimensional image representation of the fiducials 40 in the diagnostic image. An alignment processor 44 compares the position of the fiducials in the two images. In one embodiment, the alignment processor 44 determines the baricenter of the fiducials 40 in each of the aforementioned images and determines an offset or linear shift therebetween. The alignment processor also determines the distance between the baricenter and each of the fiducials 40 in each of the aforementioned images and determines a scaling factor in accordance with the variation therebetween. The alignment processor 44 also determines rays between the baricenter and the fiducials 40 in each of the aforementioned images and determines an angular offset or rotational correction between the two. Preferably, the alignment processor 44 also accesses a reference image from a reference image memory 46 to perform higher order alignment functions. More specifically to the preferred embodiment, an image of a phantom is generated with the medical diagnostic imaging apparatus A. Based on differences between the known shape of the phantom and the shape of the image, non-linear distortion adjustments for the diagnostic imaging apparatus A are generated and stored in the reference image memory 46.

The offset, scaling, rotational, and non-linear image corrections determined by the alignment processor 44 are conveyed to an image correction processor 48 which operates on the medical diagnostic image representation to bring it into alignment with and into the coordinate system of the surface image representation.

The surface and corrected diagnostic image representations are combined 50 and stored in a superimposed volumetric image memory 52. Under control of the oncologist, a video processor 54 selects portions of the superimposed volumetric image representation from the superimposed image memory 50 and converts them into appropriate form and format for display on a monitor 56 such as a video monitor, CCD display, active matrix, or the like. The video processor 52 may select slice images, surface renderings, projection images, or other diagnostic imaging formats as are known in the art.

In an alternate embodiment, the image alignment system uses a calibration phantom scan. A phantom, such as one with a three-dimensional grid of fiducials, is imaged with the MRI system. The fiducial locator 42 locates the fiducials in the MRI image representation. The alignment processor compares the actual fiducial positions with the imaged positions and generates correction factors. The correction factors can be as discussed above, vector shifts for each of a plurality of subregions, or the like. The correction factors are loaded into an analogous image correction processor 48. Optionally, a similar correction factor determining procedure is performed with the surface imaging system and loaded into an analogous image correction processor for the surface volume image. When a patient is subsequently imaged, the MRI image representation and, optionally, the surface image representation, are corrected as generated with the preloaded corrections without fiducials on the patient or the on-the-fly fiducial correlation processing.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A diagnostic imaging system comprising:

a medical diagnostic imaging apparatus for generating volumetric diagnostic image representations of an internal region of a subject in an examination region;

a 3D surface imaging system for generating a three-dimensional reference image representation of a surface of the subject in the examination region;

an image correlating system that correlates the surface and the diagnostic image representations;

an image combining means for combining the images of the internal region in the examination region and the subject surface in the examination into a single combined volumetric image representation;

a combined volumetric image representation memory in which the single combined surface and internal volumetric image representation is stored;

a video processor which withdraws selected portions of the combined image representation, and converts them into appropriate form for human-readable display.

2. The imaging system as set forth in claim 1 further including:

a plurality of fiducials disposed in the imaging region, the fiducials being imaged by both the medical diagnostic imaging apparatus and the surface imaging system such that images of the fiducials appear in both the surface image representation and the diagnostic image representation.

3. The imaging system as set forth in claim 2 wherein the image correlating system includes:

a fiducial locating processor which determines a location of the fiducials in each of the surface and diagnostic image representations; and, an alignment processor that compares the locations of the fiducials determined by the fiducial locating processor to determine a spatial deviation between the surface and diagnostic image representations.

4. An imaging system comprising:

a diagnostic imaging apparatus for generating a three-dimensional image representation of an internal region of a subject in an examination region;

a surface imaging system for generating a three-dimensional reference representation of a surface of the region of the subject in the examination region;

an alignment processor that aligns the three-dimensional internal and surface images;

an image correction processor connected with the alignment processor to correct at least one of the three-dimensional diagnostic and surface image representations in accordance with a determined deviation between the aligned three-dimensional images;

a video processor which converts selected portions of the corrected three-dimensional image representation into appropriate form for human-readable display.

5. The imaging system as set forth in claim 3 wherein the alignment processor determines at least an offset, a scaling factor, and a rotation between the diagnostic and surface image representations.

6. The imaging system as set forth in claim 3 wherein the alignment processor further accesses a reference memory which stores the information indicative of non-linear distortion in at least one of the diagnostic and surface image representations and determines a non-linear image adjustment in accordance therewith.

7. The imaging system as set forth in claim 1 wherein the surface imaging system includes a laser scanner.

8. The imaging system as set forth in claim 1 wherein the surface imaging system includes:

a hand-held unit that generates the surface image representation.

9. A diagnostic imaging system comprising:

an open magnetic resonance imaging system which includes a patient support which supports a portion of a patient between upper and lower poles of a magnet and which generates a three-dimensional diagnostic image representation of the portion of the patient between the upper and lower poles;

a hand-held unit that generates a three-dimensional surface reference image representation of a surface of the patient contiguous to the diagnostically imaged portion of the patient while the patient is on patient support;

an image correlating system that correlates and aligns the three-dimensional surface and diagnostic image representations;

an image combining means which combines the correlated and aligned three-dimensional surface and diagnostic images into a three-dimensional combined image representation;

a volumetric image representation memory in which the three-dimensional combined surface and diagnostic image representation is stored;

a video processor which withdraws selected portions of the three-dimensional combined image representation, and converts them into appropriate form for a two-dimensional human-readable display.

10. The imaging system as set forth in claim 9 wherein the image correlating system adjusts the diagnostic image representation from the open magnetic resonance scanner to bring the diagnostic image representation into a coordinate system of the surface image representation.

11. A method of diagnostic imaging comprising:

generating;

a volumetric diagnostic image representation of an internal region of a subject including at least a portion of a surface of the subject, which diagnostic image representation is distorted in a region adjacent the subject surface; and;

an three-dimensional surface reference image representation of the surface of the subject which is distorted in the diagnostic image;

adjusting at least the surface region of the diagnostic image representation in accordance with the surface image representation;

combining the three-dimensional surface image representation and the adjusted volumetric diagnostic image representation into a three-dimensional combined image representation.

12. The method as set forth in claim 11 further including:

prior to generating the diagnostic image representation, generating a phantom image representation of a phantom;

comparing the phantom image with physical dimensions of the phantom;

determining and storing correction factors in accordance with a difference between the phantom image representation and the dimensions of the phantom;

the adjusting step including adjusting the diagnostic image representation in accordance with the stored correction factors.

13. The method as set forth in claim 11 further including:

identifying a plurality of characteristic points on the subject surface;

identifying the characteristic points in the diagnostic image representation and the surface image representation; and, wherein the adjusting step includes:

determining a variation between the locations of the characteristic points in the diagnostic image representation and the surface image representation, and adjusting the diagnostic image representation in accordance with both the variations and the stored correction factors.

14. A method of diagnostic imaging comprising:

with a first imaging modality, generating a volumetric diagnostic image representation of a torso portion of a subject in an examination region;

with a second imaging modality, generating a three-dimensional surface reference image representation of a surface of the torso portion of the subject in the examination region;

determining a variation between locations of characteristic points in the volumetric diagnostic image representation and the three-dimensional surface image representation;

non-linearly adjusting the volumetric diagnostic image representation in accordance with the determined variation;

combining the three-dimensional surface image representation and the adjusted volumetric diagnostic image representation.

15. The method as set forth in claim 14 further including:

affixing fiducials which are identifiable in both the diagnostic image representation and the surface image representation to the characteristic points on the subject surface.

16. The method as set forth in claim 14 wherein the step of determining the variation includes:

determining an offset, a scaling factor, a non-linear shift, and a rotation between the locations of the characteristic points in the diagnostic and surface image representations.

17. The method as set forth in claim 11 wherein the step of generating the diagnostic image representation includes:

conducting a magnetic resonance scan.

18. The method of diagnostic imaging as set forth in claim 17 wherein the step of generating the surface image representation includes optically scanning the surface of the subject.

19. The method of diagnostic imaging as set forth in claim 18 wherein the step of optically scanning the surface of the subject includes laser scanning the subject.

20. The method of diagnostic imaging as set forth in claim 11 wherein the step of generating the surface image representation includes one of laser scanning, video scanning, and ultrasonic scanning of the surface of the subject.

* * * * *